(12) United States Patent
Summerfield

(10) Patent No.: US 10,438,167 B2
(45) Date of Patent: Oct. 8, 2019

(54) TRADEMARK SEARCH RESULTS PRESENTATION SYSTEMS AND METHODS

(71) Applicant: Cindy Summerfield, Hinsdale, IL (US)

(72) Inventor: Cindy Summerfield, Hinsdale, IL (US)

( * ) Notice: Subject to any disclaimer, the term of this patent is extended or adjusted under 35 U.S.C. 154(b) by 177 days.

(21) Appl. No.: 14/216,921

(22) Filed: Mar. 17, 2014

(65) Prior Publication Data

US 2014/0280104 A1 Sep. 18, 2014

Related U.S. Application Data

(60) Provisional application No. 61/790,181, filed on Mar. 15, 2013.

(51) Int. Cl.
| | |
|---|---|
| *G06Q 10/10* | (2012.01) |
| *G06F 17/27* | (2006.01) |
| *G06F 17/21* | (2006.01) |
| *G06Q 50/18* | (2012.01) |

(52) U.S. Cl.
CPC .......... *G06Q 10/10* (2013.01); *G06F 17/218* (2013.01); *G06F 17/2735* (2013.01); *G06F 17/2785* (2013.01); *G06F 17/2795* (2013.01); *G06Q 50/184* (2013.01)

(58) Field of Classification Search
CPC .. G06Q 50/184; G06Q 10/10; G06F 17/2785; G06F 17/218; G06F 17/2735; G06F 17/2795; G06F 17/30613; G06F 17/30707; G06F 17/30716; G06F 17/30; G06F 17/3087; G06F 17/24; G06F 17/27; G06F 17/28
USPC ................ 707/724, 711, 723, 749, 750, 767, 707/999.003, 999.005, E17.014, E17.008; 715/257
See application file for complete search history.

(56) References Cited

U.S. PATENT DOCUMENTS

| | | | | |
|---|---|---|---|---|
| 2003/0158743 | A1* | 8/2003 | Havlick | G06Q 10/10 705/310 |
| 2003/0171949 | A1* | 9/2003 | Degnan | G06Q 50/184 705/310 |
| 2007/0208719 | A1* | 9/2007 | Tran | G06F 17/30864 |
| 2011/0047166 | A1* | 2/2011 | Stading | G06F 17/30637 707/749 |
| 2011/0066648 | A1* | 3/2011 | Abhyanker | G06F 17/30864 707/770 |

(Continued)

*Primary Examiner* — Jeff A Burke
*Assistant Examiner* — Kamal K Dewan
(74) *Attorney, Agent, or Firm* — Richards Patent Law P.C.

(57) ABSTRACT

A system providing trademark search results includes: a controller; a display controlled by the controller; and a memory coupled to the controller, wherein the memory is configured to store program instructions executable by the controller; wherein in response to executing the program instructions, the controller is configured to: receive a data set of trademark search results including a searched mark, a plurality of reference, and at least one proximity score between each reference and the searched mark; and provide through the display an interactive visual representation of the search results including a displayed relationship between the searched mark and at least two of the plurality of references, wherein the displayed relationship between the searched mark and the at least two of the plurality of references is a visual representation of the proximity score between the searched mark and each of the at least two of the plurality of references.

12 Claims, 5 Drawing Sheets

(56) References Cited

U.S. PATENT DOCUMENTS

| | | | | |
|---|---|---|---|---|
| 2011/0246452 A1* | 10/2011 | Johnston | ............ | G06Q 30/06 |
| | | | | 707/722 |
| 2012/0221580 A1* | 8/2012 | Barney | ............ | G06F 17/30675 |
| | | | | 707/748 |
| 2013/0275427 A1* | 10/2013 | Tan | ............ | G06Q 10/00 |
| | | | | 707/736 |
| 2014/0149403 A1* | 5/2014 | Miller | ............ | G06F 17/30696 |
| | | | | 707/728 |
| 2014/0181007 A1* | 6/2014 | Kolehmainen | ...... | G06Q 50/184 |
| | | | | 707/607 |
| 2016/0004768 A1* | 1/2016 | Barney | ............ | G06F 16/24578 |
| | | | | 707/749 |
| 2016/0350886 A1* | 12/2016 | Jessen | ............ | G06Q 50/184 |

\* cited by examiner

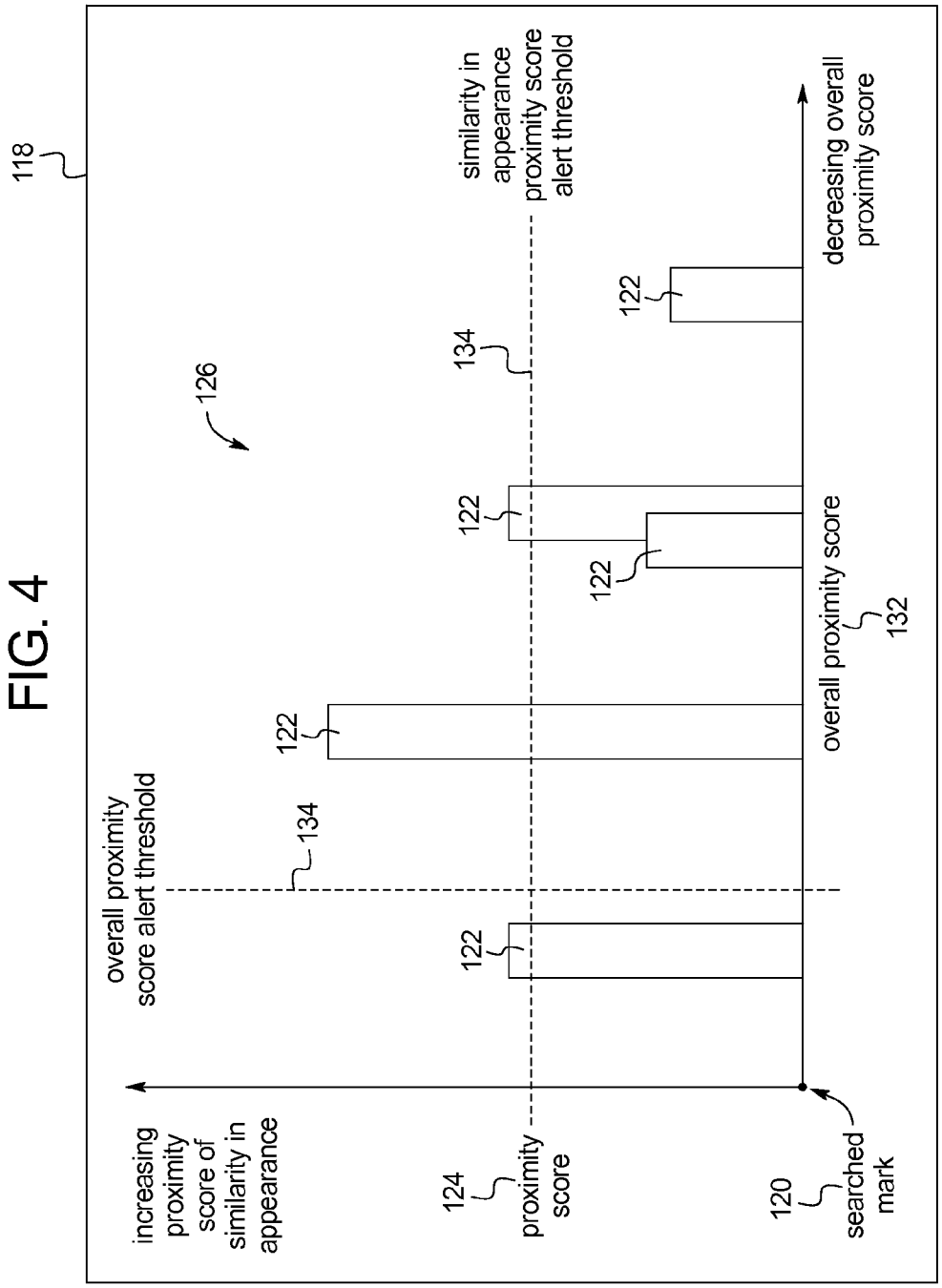

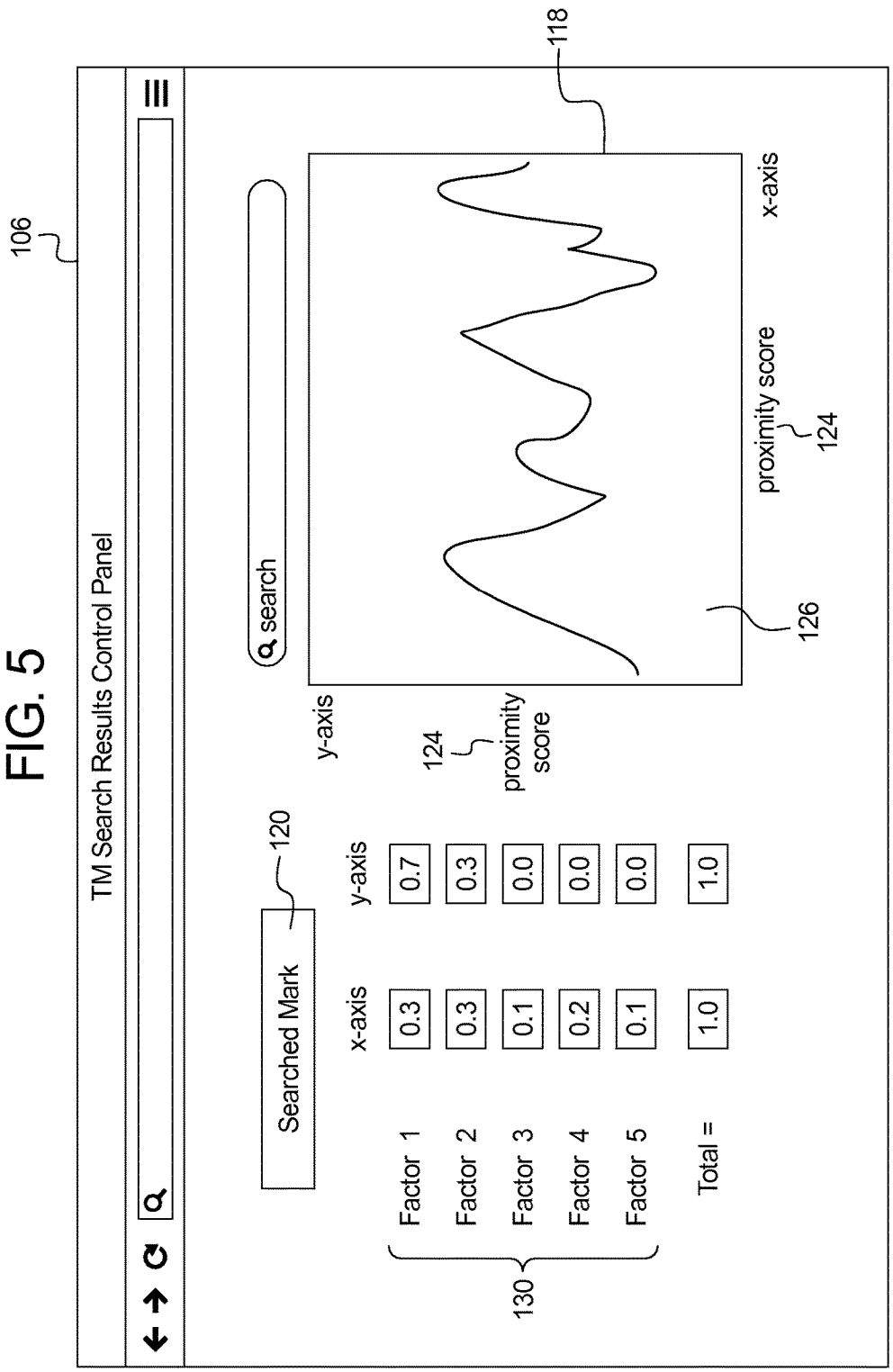

TRADEMARK SEARCH RESULTS PRESENTATION SYSTEMS AND METHODS

CROSS-REFERENCE TO RELATED APPLICATIONS

This application incorporates by reference and claims the benefit of priority to U.S. Provisional Application 61/790,181 filed on Mar. 15, 2013.

BACKGROUND OF THE INVENTION

The present subject matter relates generally to systems and methods for presenting search results. More specifically, the present subject matter discloses systems and methods for presenting trademark search results in an interactive visual presentation based on one or more user adjustable weighted proximity metrics.

The results of a trademark search are routinely evaluated when making significant business, legal, and investment decisions regarding branding, marketing, product development, licensing, enforcement, etc.

The review and analysis typically involved when an attorney reviews conventional trademark search reports involves a comparison of the searched mark to the references revealed in the search. In particular, the attorney is primarily assessing the similarity of the references to the searched mark, and the similarity of the good or services of the references to the searched mark. While likelihood of confusion factors, such as those known as the in DuPont factors and Polaroid factors, are relevant and sometimes examined through external investigations, present trademark searches rarely provide this sort of information.

The quality of the analysis of trademark search records impacts both the attorney and client's ability to make high quality, informed decision regarding trademark matters. The quality of the analysis of the trademark search results is in part dependent on the skill and experience of the attorneys and/or business people involved. However, the content and presentation of the search results can have a strong impact on the efficiency and quality of the analysis. For example, current search results that contain lists of trademarks contained in hundreds of pages are more difficult to analyze than sorted, categorized, prioritized, analyzed, evaluated, or metric driven or based presentations. And, of course, search results that incorporate additional relevant information and provide for more in-depth analysis are more likely to lead to better decisions made by the attorneys and business people.

The typical trademark search draws information from a limited number of resources and databases. Commonly, U.S. trademark searches focus on: USPTO records; state trademark records; common law databases (i.e., search engine search results); registered business names; and domain names. But trademark infringement issues depend on many factors not easily captured from these data sources. Currently, trademark search results do not often capture relevant information regarding: the purchaser, the conditions under which, and buyers to whom, sales are made (i.e., "impulse" vs. careful, sophisticated purchasing); the fame of the prior mark; the nature and extent of any actual confusion; and other DuPont and Polaroid factors. Without this important information, trademark search results may be incomplete and even a perfect evaluation of incomplete results is less than optimal. Being able to appropriately analyze this relevant information would be a great benefit.

Presently trademark searches do not provide any guidance on the likelihood that the trademark office is to approve the searched mark for registration.

Additionally, trademark searches do not provide any guidance on the desirability of selecting exclusive of legal risk considerations.

Trademark search results are often prepared with the assistance of search software, to search databases, retrieve and store data, etc. Trademark search results are typically comprised of a long list of references turned up in the search provided to attorneys and business people for analysis in a list format, such as an on-line or electronic format, PDF, or printed document; often several hundred pages long. Simplified summaries traditionally consist of charts with the numbers of references found in each of several fixed categories. The fixed format is limiting in that it is time consuming to review and limits and in many cases prevents customization. Online formats still require review of the entire lengthy search report, but offer the ability for the user to categorize risk by high, medium, low and then sort the results by category. Importantly, the ability to have a presentation of search results that visually depicts the landscape and immediately presents a sense of the ability to use and register as well as the desirability of selecting a proposed trademark without the need to review hundreds of references as well as the ability to reorganize of the results as the reviewer wishes to view various aspects of the results or view the results while weighting or considering the various factors in different ways offers a significant advancement and advantage for the attorney.

Possibly most importantly, existing trademark search results presentations do not provide visually significant interactive information that enables a user to efficiently evaluate and interpret the search results.

At their core, trademark searches are intended to help answer two primary questions: (1) how likely am I to be able to use this searched mark without infringing others' rights; and (2) how likely am I to be able to register this searched mark? Trademark search results can be better adapted to answer these core questions and provide a cost effective method to guide a user in selecting a mark.

Accordingly, there is a need for systems and methods that may be used to improve the presentation and evaluation of trademark search results, as described and claimed herein.

BRIEF SUMMARY OF THE INVENTION

To meet the needs described above, and others, the present disclosure provides systems and methods for conducting and presenting trademark search results in an interactive visual presentation based on one or more user adjustable weighted proximity metrics. Further, the subject matter disclosed herein provides methods for improving the quality of the search results themselves by offering the ability to incorporate a wider range of metrics into the search parameters. The solutions provided herein are intended to improve a user's ability to efficiently and accurately identify and assess the risks associated with a particular name and understand how likely the user is to be able to use a proposed trademark and how likely is the user to be able to register the searched trademark as well as the desirability of using a searched trademark.

The term "searched mark" is used throughout the disclosure with reference to the mark around which search results are based. It is understood that the searched mark may be a proposed mark or may be an existing mark that is being evaluated for any number of reasons. In other words, the searched mark is, essentially, the mark around which the search is based.

At a high level, the subject matter provided herein is adapted to derive a data set from the results of a trademark search and present elements of the data set to a user in a user adjustable visual representation. In a preferred embodiment, the user adjustable visual representation is based on a representation of proximity scores between a searched mark and references. The metric-based visual presentation may be provided based on default settings, while enabling the user to manipulate the weighting of proximity scores, thereby altering the visual representation.

The systems and methods provided herein enable a user to efficiently evaluate trademark search results from varying perspectives in a format that is easier to digest than previously available search results presentations. The calibration and filtering functions provided herein provide for additional data to allow for an efficient and specific analysis of client or industry specific measures. And by enabling a user to manipulate search results in a dynamic user control input mechanism allows for more efficient and complete analysis.

For example, in one example of the solutions described herein, a trademark search is completed in which a searched mark is compared to a number of potentially relevant references, such as existing trademark registrations, common law references, domain names, etc. The search results are compiled into a data set, which may be stored in any appropriate data storage mechanism. The data set is analyzed to determine proximity scores for each of a plurality of categories associated with each reference. For example, the categories may include: similarity in appearance; similarity in sound; similarity in connotation; similarity in commercial impression; similarity of the goods/services; similarity of trade channels; similarity of the condition under which sales are made; fame of the prior mark; etc. The associated proximity scores are objective measurements of potential trademark risks and conflicts.

There are many ways in which the proximity scores may be implemented, as will be apparent to those skilled in the art based on the disclosures provided herein. In one example, proximity scores are represented by a numerical score 0-5, with the higher score representing a higher concern. In such an example, a higher proximity score for similarity in appearance indicates a higher degree of similarity in appearance. A higher proximity score for conditions under which sales are made indicates a less sophisticated purchaser. A higher score for fame of the prior mark indicates a more famous prior mark. In other words, the higher the proximity score, the more likely the factor is to indicate potential infringement or conflict. In another example, a lower number may indicate the factor is more likely to indicate a potential infringement or conflict. Of course, there are nearly limitless ways to use numerical proximity scores to indicate how profoundly a factor may influence a trademark analysis.

It is contemplated that a proximity score may be computed for each category for each reference. In addition, an analysis of the categorical proximity scores associated with a reference may be used to determine an overall proximity for the reference. Each of the categories may be given a weighting when determining the overall proximity for the reference. Also, not all categories may be used in determining the overall proximity. While not necessarily included in the weighting, particular factors such as competitors or channels of trade can be specifically designated and reviewed by a user based upon filtering capabilities.

For example, the overall proximity score of a given reference may be derived from a combination of the proximity of the marks and the proximity of the goods and services. In one embodiment, the overall proximity score may be 0.75 multiplied by the proximity of the marks plus 0.25 multiplied by the proximity of the goods and services. In such an embodiment, a mark with a proximity score of 1.5 for the marks and a proximity score of 2 for the goods and services would have an overall proximity score of 1.625.

In addition, proximity scores within a given category may be derived from a combination of subcategories. For example, the category "proximity of the marks" may be derived from a combination of independent proximity scores including, but not limited to: similarity in appearance; similarity in sound; similarity in connotation; similarity in meaning of foreign words, and combinations thereof.

In addition to the traditional search databases, the proximity scores may take into consideration information derived from social media and other "big data" sources. This improves the metrics from which people are able to derive quantitative and qualitative information.

For example, using social media data, trademark search results may be able to provide a proximity score for the buyers to whom the goods and services are sold. For example, based on data derived from one or more social media platforms, it is possible to identify that the goods and services associated with the searched mark are sold to different buyers than those of an identified reference, thereby generating a lower proximity score for the "buyers to whom sales are made" category. Similarly, data derived from one or more cookies collecting information online may be used to determine who is buying particular goods and services, which helps to generate a proximity score in the channels of trade category. Incorporating these data sources into the trademark search process enables users to derive relevant/pertinent information regarding buyers, market segments (married women over 35 with children), micro-segments (soccer moms), etc.

Another example of using proximity scores derived from big data and social media relate to the reputation of particular references identified in a search report. Particularly, a reference in a search having an unusually undesirable reputation proximity score could impact the selection of the searched trademark over concerns of inadvertent associations with the reference.

In one embodiment of the solutions provided herein, the proximity scores are derived from algorithmic evaluation of the references and the data sets from which they are located. In certain contemplated embodiments, one set of algorithmic processes are used to generate proximity scores and a second set of algorithmic processes are used to put the proximity scores into greater context and a visually accessible way.

For example, the search results described herein may further include metrics that enable a user to evaluate the searched mark against historical norms based on what the USPTO or other trademark office has previously allowed. For example, the historical norms may be established and/or adapted by applying an algorithmic evaluation between known allowed marks as well as known allowed marks in light of references cited against the registration during the examination process. Similarly, the search results may further include metrics that enable a user to evaluate the searched mark against historical norms based on court cases involving litigated trademarks. For example, historical norms may be established and/or adapted by applying an algorithmic evaluation between known marks that were previously litigated. In another example, historical means may be developed based on an analysis of co-existing marks, particularly co-existing marks in light of the identified goods and services. An algorithmic evaluation of the proximity scores across a range of categories between various pairs of cited/litigated marks may demonstrate trends, thresholds, critical metrics, etc. that can be factored back into the algorithms used to derive the proximity scores.

The use of proximity scores as a basis for comparing proposed marks and references, or otherwise comparing marks that may potentially be in conflict, lends itself to the use of customizable, interactive visual reports. The customizable, interactive visual reports may be valuable in making the trademark search results more easily digestible.

In one embodiment of the solutions provided herein, a visual presentation of the references with respect to the searched mark is made, in which the visual presentation of the references represents their proximity to the searched mark. The proximity may be based on one or more factors. When based on more than one factor, the various factors may be weighted in any manner, including equally weighted.

Visual presentations may be made by providing charts, graphs, other infographic representations, and data visualization techniques in which visual elements represent the searched mark and the references identified in the search. The proximity between each reference and the searched mark may be visually identifiable. It is understood that visual representations of proximity may take any number of forms.

For example, it is contemplated that the proximity may be visually represented by physical distance between the references and the searched mark (or some other reference point). The results could be presented in order of increasing or decreasing proximity scores. Alternatively (or additionally when multiple layers of proximity are being illustrated or presented), other visual indicators may be used, including: shape, color, boldness, size, motion, sound, etc. For example, a higher proximity score may be identified by a shape with a fewer number of sides (e.g., the most proximate marks may be represented by a triangle and the least proximate marks may be represented by a circle). A higher proximity score may be indicated by a more vibrant color. A higher proximity score may be identified by a bolder line weight. A higher proximity score may be represented by a large icon. A higher proximity score may be represented by a faster spinning and/or blinking icon, with the least proximate marks being identified by stationary icons.

The visual presentation may be adapted, calibrated, filtered, and presented in different viewing formats to display a single proximity metric, an average of several proximity metrics (weighted or non-weighted average), or it may illustrate multiple proximity metrics simultaneously. For example, when illustrating multiple proximity metrics in a visual presentation, the various axis of proximity may be shown using combinations of distance, shape, color, boldness, size, motion, etc. The visual presentation may take many forms, as will be understood based on the descriptions provided herein.

In one example, the visual presentations may be filtered based on ranges of proximity scores. For example, in an embodiment in which a lower number indicates a higher likelihood of confusion between a searched mark and one or more identified references, the visual presentation may be adapted to display only those results in which the proximity score is 0-1.5. Then, based on how the user wants to visualize the results, the user may increase or decrease the range of proximity scores shown in the visual presentation. For example, if the user wants to narrow down the view, the user may adjust the visual presentation to show only those trademarks whose proximity score is less than 1. Alternatively, for a wider view of the results, the user may broaden the visual presentation to show all references between 0-3.

In one example, multiple proximity metrics are represented in a visual presentation wherein a proximity score is indicated by distance from the searched mark, similarity in appearance is indicated by shapes; similarity in sound is indicated by color; similarity in connotation is indicated by boldness; similarity in commercial impression is indicated by size; similarity of the goods and services is indicated by motion; and combinations thereof. For example, the visual presentation may be provided in a bulls-eye style chart wherein the distance of each reference from the searched mark provides a visual indication of the likelihood of confusion of the searched mark with the reference based on the proximity algorithms.

In another embodiment, the results may be provided on a linear continuum presented based on the proximity of any of the measured factors (e.g. proximity of the marks, proximity of the goods, etc.) The presentation may also be done alphabetically, based on the filing date (and then closest proximity to farthest), whether the reference is registered or an application (and then closest proximity to farthest), actual use versus intent-to-use applications, the number of extensions (and then closest proximity to farthest), by country, or based on other characteristics of the results, and combinations thereof.

The systems and methods presented herein may be implemented to provide more than a simple static output. The visual presentations may be adjustable and dynamic to user control/input. For example, an initial visual presentation may be made by applying default algorithms and weighting to a set of search results. In response to the initial visual presentation, the user can adjust one or more algorithms used to weight the visual presentation. For example, a user may wish to quickly evaluate proximity of the marks and may control the system to adapt the visual presentation to be based solely on proximity of the marks. Such adaptation may be provided through a user controlled dashboard through which the user makes adjustments to the visual presentation, thereby creating a dynamic visual presentation. Accordingly, the user may dynamically adapt the visual presentation to best analyze the information and quickly understand the proximity scores provided by the analytical algorithms.

It is understood that there are numerous aspects of the visual presentation that may be calibrated both pre and post search. For example, the various metrics may be weighed objectively or comparatively. The systems and methods may be leveraged such that the variables such as: whether a given reference's owner is a competitor; the time to, or vulnerability to, cancellation (in the US) or non-use cancellation (outside of the US); the aggressiveness of the registrant of the reference (based on TTAB records, court cases, similar factors outside of the US); and similar metrics may be used in addition to the traditional DuPont and Polaroid Factors.

In addition to the adaptive visual presentation controls described above, it is further contemplated that the systems and methods described herein may be adapted to flag, or highlight, any references that are at a specific threshold with reference to the searched mark. Further, a mechanism may be provided that will visually indicate search references that have already been viewed, either through shading, different color, etc. Moreover, there may be an option to indicate whether the reference is registered, pending, based on a foreign application/registration, a state reference, or common law. For example, all intent-to-use applications may be flagged a specific color so they may be easily identified. As shown, there are many metrics that may be integrated and visualized using the teachings provided herein.

The determination of the proximity scores may be used to trigger an alert or some other response. For example, a searcher may indicate that the search should be halted as soon as a first reference is identified with a proximity score under 0.25. Of course, numerous variations of proximity score based triggers may be implemented.

As provided herein, a user may adjust the variables, conditions, parameters, etc. of the search and/or the presentation of the search results. It is understood that such customization may be made before or after running the search and acquiring the search results. Examples are provided, but it is understood these examples are merely illustrative and the teachings herein may be applied across a large range of examples and embodiments. It would be impossible to list all of the examples and embodiments that will be understood by those skilled in the art based on the descriptions provided herein.

In a first example, default conditions may be established such that in a search for a given mark, if a reference is found with an identical mark within the same class, the proximity score is 1. However, if the identical mark is found within a different class, the proximity score may be greater. A table of corresponding proximity scores may be provided such that within a given class, an identical mark is another class will have a specific proximity score. For example, a user may order a trademark search for a given mark with goods in Class 20. The default conditions may provide that an identical mark found in Class 44 is given a proximity score of 3. The default conditions may be adjusted before the search is run and/or as the search results are presented to the user. For example, a user may choose to view the search results wherein the proximity scores across classes are given their default values and then reexamine the search results after changing the defaults such that rather than having a proximity score of 3, an identical mark found in Class 44 is given a proximity score of 1.

Similarly, in another practical example, a user may run a search for a given mark for goods in Class 30 and may request the proximity score for any reference related to specific goods or services such as a coffee shop services be 1.

As described briefly above, a user can assign a specific proximity threshold that will automatically stop the search from proceeding until further authorization. This may be useful in limiting the search expense in cases in which fatal results are returned early in the process. Automatic stops may be established based on proximity scores in a single category or combinations of categories. For example, the similarity of marks may trigger an automatic stop at a specific proximity score. The "stop score" may be user provided. The stop score may be based on historical norms. In another example, the automatic stop is triggered when the proximity score for the similarity of marks plus the proximity score for the goods crosses a given threshold. Other examples include, similarity of marks plus social media score, similarity of marks plus big data score in a particular segment, etc.

In another example, a user may define that references owned by certain companies (e.g. competitors' marks) may be given a more relevant proximity score or otherwise designated/highlighted in the results (e.g. color, boldness, shape, etc.).

As described, the search results may be presented in user adjustable visual presentations. For example, a user may adjust the presentation of the search results to only provide references that have a certain proximity score, or a particular range of proximity scores (e.g. references in the search that have similarity proximity scores of 0-0.5). In one contemplated visual presentation, the data can be viewed as if in concentric circles (i.e., a target), each circle representing a particular proximity range. Thus, references with a score of 0 will be closer to the center of the target than those with a score of 0.25, which in turn are closer than those with a score of 0.5. After looking at the references in the 0-0.5 range, the user may then adjust the presentation to show all marks within a 0-1.5 range.

Similarly, a user may adjust the presentation of the search results such that only references that have a certain proximity scores based on a combination of the similarity of the marks and the similarity of the goods and services are shown.

In another example, a user may wish to view the references in light of how litigious the owner of a reference may be. Accordingly, the presentation may be adjusted such that a proximity score is given for each reference to indicate litigiousness, for example, by identifying the number of times that the registrant of the reference has filed for opposition and the proximity score of the opposed mark to the registrant's mark. In this example, the proximity comparison between the opposed mark and the reference may be the same proximity comparison used to compare the searched mark with the reference. Thereby giving the user a clear indication of whether, in light of the analysis the user has chosen to use, the opposed mark was more or less proximate to the reference than the searched mark is. In this example the proximity score may be used as a type of predictive analytic because it provides a sense of the likelihood that the reference owner is to oppose the registration of the user's mark.

As noted above, the presentation of the search results may be adjusted to specifically identify intent-to-use applications, use applications, and registrations. For intent-to-use applications, through numerical representation or any of the other formats previously discussed (e.g. color or shade etc.) the system can indicate the number of extensions the application owner has filed. The proximity score may be adjusted and/or a visual indicator may be applied to distinguish the three categories. Similarly, the results may be adjusted to indicate (through proximity score or other visual indicator) when a mark is vulnerable to non-use cancellation (i.e., due for a maintenance filing within the next six months).

Another example of using proximity scores in connection with a competitor's or registrant's information may pertain to when a client would like understand the competitor's customers as compared to client's proposed goods. A search is performed and the information can be calibrated based on default scores, or adjusted by client either scored or simply provided in raw form. For example, a proximity score may be based solely on a segment of women over 30 with children or even micro-segments, such as, "soccer moms."

Clients may want to know a proximity score related to a registrant's other or similar applications in other classes. This information is particularly relevant to one of the DuPont Factors that relates to how likely the registrant is to expand into other goods/services. Another use of the systems' calibration feature is the capability to further filter the results obtained from a registrant's application to those which belong to a certain class, for example, the class relevant to the client's proposed mark. It is contemplated that a registration in multiple classes suggests that the goods/services in all the classes contained in the registration are related. Another example of the use of the system is to map out a trademark owner or competitor's trademark portfolio by placing the trademark portfolio in a user-controlled visual presentation based on proximity scores for any number of factors, enabling the user to identify previously unseen patterns.

Similar to the systems' capability to generate proximity scores, the systems provided herein can also generate divergent scores, which may be translated into an innovation score, or strength score, for names. The use of divergent scores, especially if presented on a heat map, could be used to indicate where there is "white space" in the various trademark registries or common law areas. White space could then be used as a risk minimization approach for new brand development.

As noted, additionally, divergent ratings could be used to determine the "strength of the mark." For example, a searched trademark that is not a real word and has a low proximity score with respect to the specific goods or services comparison or the class comparison may have a high divergent score, which means it is likely to be a strong mark. The divergent score may be presented in a visual format and/or factored into the overall proximity score.

An advantage of the systems and methods provided herein is that they provide systems and methods for providing search results in an easy to view, compact, format and provide a valuable, usable, customizable, interactive visual report.

An advantage of the systems and methods provided herein is that they provide users the ability to adjust proximity scores to further the user's analysis.

Another example of the benefit of the system's user adjustable proximity scoring and calibration capabilities has to do with the DuPont factor relating to the extent of the market interface. In measuring market interface, the extent of laches and estoppel attributable to the owner of the prior mark is considered an indication of the likelihood of confusion. For example, using the proximity scoring and calibration tools for any number of factors, the user can measure the proximity of co-existing registrations and applications to a particular reference revealed in the search and then compare those proximity scores to the searched mark and the particular reference as measurement of market interface.

Another example of the system's user adjustable proximity scoring and calibration capabilities has to do with identifying whether the searched mark would co-exist in a crowded field. For example, by adjusting the range of mark similarity scores and the goods or services views or any of the other adjustable measure, the user is able to look for patterns and metrics that indicate the strength of the searched mark and the scope of protection, as well as whether the searched mark would co-exist with other marks in a crowded field.

Another example of the systems' user adjustable proximity scoring and calibration capabilities has to do with measuring the strength of the searched mark on a spectrum of trademark strength and the potential scope of protection based on the strength of the searched mark (e.g., divergent score). The systems disclosed herein have the ability to compare the searched mark to real words and calculate a proximity score for the searched mark on how closely it resembles a real word as identified in many sources such as dictionaries, thesauruses, etc. Once the proximity score for real words has been generated, the system will then analyze the proximity of the goods to the searched mark for the purpose of calculating the arbitrariness, fancifulness, suggestiveness, descriptiveness, and/or genericness of the search mark. For example, if the user searched mark APPLE for apples, the system would generate an overall proximity score that indicates the mark is highly descriptive to generic, in contrast to a search for APPLE for computers in which the system would generate a proximity score that indicates the searched mark is arbitrary.

It will be apparent to those skilled in the art that the inventive systems described herein may be embodied in many examples of systems for providing trademark search results. For illustrative purposes, in one such example, a system providing trademark search results includes: a controller; a display controlled by the controller; and a memory coupled to the controller, wherein the memory is configured to store program instructions executable by the controller; wherein in response to executing the program instructions, the controller is configured to: receive a data set of trademark search results including a searched mark, a plurality of reference, and at least one proximity score between each reference and the searched mark; and provide through the display an interactive visual representation of the search results including a displayed relationship between the searched mark and at least two of the plurality of references, wherein the displayed relationship between the searched mark and the at least two of the plurality of references is a visual representation of the proximity score between the searched mark and each of the at least two of the plurality of references.

The controller may be configured to provide a control through which a user manipulates a weighting factor associated with at least one of the visually represented proximity scores, thereby altering the visual representation. The weighting factor may be a single factor or a plurality of factors. For example, the weighting factor for a proximity score may be adjusted so that relative importance of the similarity of the mark is greater than the relative importance of the similarity of the goods and services or vice versa. The weighting factor may be any expression of relative importance between one or more factors contributing to a proximity score.

The at least one proximity score between a given reference and the searched mark may include a proximity score representing: an objective measurement of similarity in appearance between the searched mark and the given reference; an objective measurement of similarity in sound between the searched mark and the given reference; an objective measurement of similarity in connotation between the searched mark and the given reference; an objective measurement of similarity in commercial impression between the searched mark and the given reference; an objective measurement of similarity of the goods/services between the searched mark and the given reference; an objective measurement of similarity of trade channels between the searched mark and the given reference; an objective measurement of the similarity of the conditions under which sales are made between the searched mark and the given reference; and/or an objective measurement of the fame of the given reference.

In some instances, the at least one proximity score is represented by a numerical score, with a higher score representing a higher concern.

In some instances, the at least one proximity score includes an overall proximity score between each reference and the searched mark, wherein the overall proximity score for a given reference is derived from an aggregation of a plurality of proximity scores between the given reference and the searched mark. The overall proximity score may be based on a weighted aggregation of a plurality of proximity scores between the given reference and the searched mark and the controller is further configured to provide a control through which a user individually manipulates the weighting of the plurality of proximity scores, thereby altering the visual representation.

In some instances, at least one proximity score is a proximity score for the buyers to whom the goods/services are sold or the channels of trade through which the goods/service are sold derived from social media data (e.g., data derived from Facebook, Twitter, etc.) and other Big data (e.g., other systems, sensors, mobile devices, etc.). For example, the at least one proximity score may be a proximity score based on the reputation of a given reference derived from social media data (e.g., the number of Facebook Likes or Twitter followers).

The visual representation of the proximity score between the searched mark and each of the at least two of the plurality of references may be such that a distance between a visual object representing the searched mark and visual objects representing the at least two of the plurality of references represents a magnitude of the proximity score.

The visual representation of the proximity score between the searched mark and each of the at least two of the plurality of references may be embodied in a shape, color, boldness, size, or motion.

In some instances, the controller may be further configured to trigger an alert when a proximity score between a reference and the searched mark exceeds a proximity score alert threshold. For example, the proximity score alert threshold may be binary condition triggered by a specific value of an owner variable. In other instances, the proximity score alert threshold may be a numerical value for the calculated proximity. The proximity score alert threshold may be a valuable tool in helping to automate the identification of references that may be of particular interest for a user. For example, the proximity score alert threshold may be manually set by a user of the system and a comparison of the proximity score between each reference and the searched mark and the proximity score alert threshold may be automatically analyzed by the controller to alert the user when the alert conditions exist.

The disclosure herein describes a system providing trademark search results that in many instances (though not all) rely on visual representations of data. The visual representations may be embodied in any of numerous known forms for communicating visual data. Though it is understood that the examples provided herein of visual representations are a small sampling of a wide range of visual representations that may be used in accordance with the teaching provided by this disclosure.

The present disclosure provides a system providing trademark search results comprising a controller, a display controlled by the controller, and a memory coupled to the controller, wherein the memory is configured to store program instructions executable by the controller. In response to executing the program instructions, the controller is configured to receive a data set of trademark search results including a searched mark, a plurality of reference, and at least one proximity score between each reference and the searched mark. The controller is also configured to provide through the display an interactive visual representation including a displayed relationship between the searched mark and at least two of the plurality of references. The displayed relationship between the searched mark and the at least two of the plurality of references is a visual representation of the proximity score between the searched mark and each of the at least two of the plurality of references.

In an example, the controller is further configured to provide a control through which a user manipulates a weighting factor associated with at least one of the visually represented proximity scores, thereby altering the visual representation.

The at least one proximity score between a given reference and the searched mark may include a proximity score representing an objective measurement of similarity in appearance between the searched mark and the given reference. Alternatively, or in addition to, the proximity score may represent an objective measurement of similarity in sound between the searched mark and the given reference.

The proximity score may represent an objective measurement of similarity in connotation between the searched mark and the given reference. In yet another example, the at least one proximity score between a given reference and the searched mark may also include a proximity score representing an objective measurement of similarity in commercial impression between the searched mark and the given reference.

The proximity score may represent an objective measurement of similarity of the goods/services between the searched mark and the given reference. Alternatively, or in addition to, the at least one proximity score between a given reference and the searched mark may include a proximity score representing an objective measurement of similarity of trade channels between the searched mark and the given reference.

The proximity score may represent an objective measurement of the similarity of the conditions under which sales are made between the searched mark and the given reference. The proximity score may also represent an objective measurement of the fame of the given reference. The at least one proximity score is represented by a numerical score, with a higher score representing a higher concern.

In an example, the at least one proximity score includes an overall proximity score between each reference and the searched mark, wherein the overall proximity score for a given reference is derived from an aggregation of a plurality of proximity scores between the given reference and the searched mark.

The overall proximity score may be based on a weighted aggregation of a plurality of proximity scores between the given reference and the searched mark. The controller may be further configured to provide a control through which a user individually manipulates the weighting of the plurality of proximity scores, thereby altering the visual representation.

At least one proximity score may be a proximity score for the buyers to whom the goods/services are sold or the channels of trade through which the goods/service are sold derived from social media data. At least one proximity score may be a proximity score based on the reputation of a given reference derived from social media data.

The visual representation of the proximity score between the searched mark and each of the at least two of the plurality of references may be such that a distance between a visual object representing the searched mark and visual objects representing the at least two of the plurality of references represents a magnitude of the proximity score.

The visual representation of the proximity score between the searched mark and each of the at least two of the plurality of references may be a shape, color, boldness, size, or motion.

The controller may be further configured to trigger an alert when a proximity score between a reference and the searched mark exceeds a proximity score alert threshold. In an example, the proximity score alert threshold is binary condition triggered by a specific value of an owner variable. The proximity score alert threshold may also be manually set by a user of the system and a comparison of the proximity score between each reference and the searched mark and the proximity score alert threshold is automatically analyzed by the controller.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 4 is an example of the visual representation of trademark search results shown in FIG. 3 after a user has manipulated a weighting factor.

FIG. 5 is an example of a user interface through which a user manipulates one or more weighting factors.

DETAILED DESCRIPTION OF THE DRAWINGS

Figure 1:
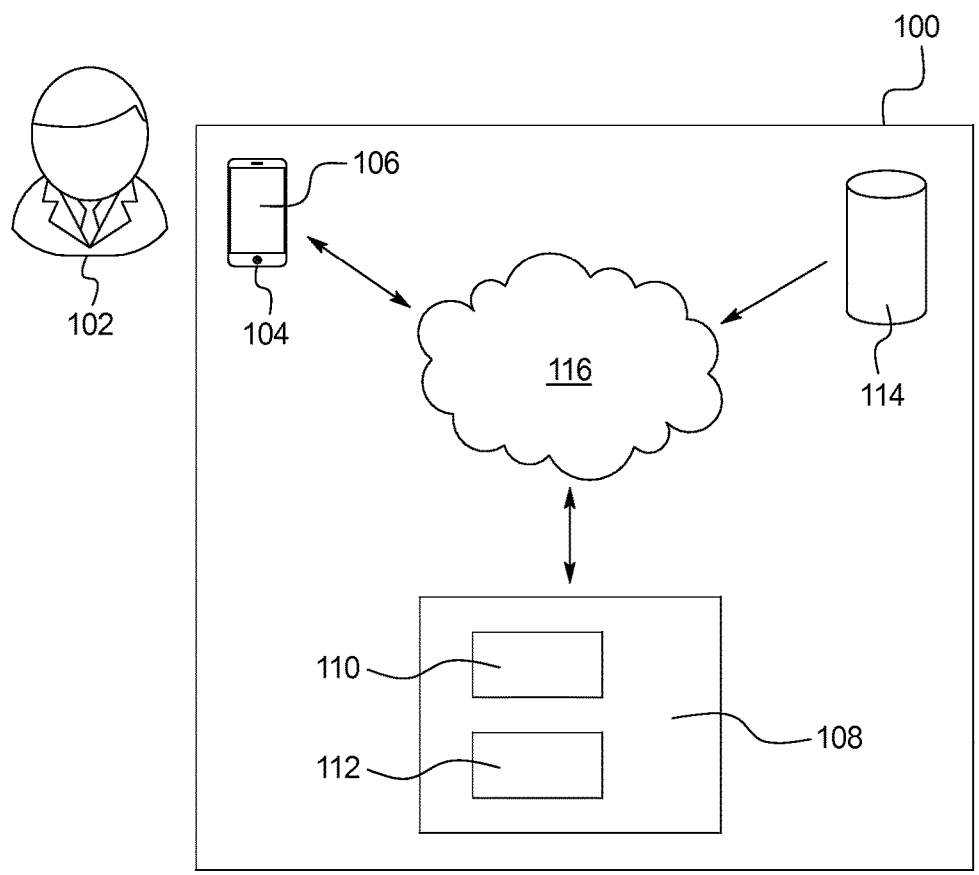
FIG. 1 is a schematic representation of a system providing trademark search results according to the teachings herein.

FIG. 1 illustrates and example of a system 100 for providing trademark search results according to the teachings herein. As shown in FIG. 1, a user 102 interacts with the system 100 through a user device 104. The user device 104 may be computer, mobile device, etc. For example, the user device 104 may be a single device or may be simultaneous provided through multiple devices, etc. User interface 106 may be a GUI provided through appropriate input/output devices (e.g., mouse, keyboard, and display on a desktop computer; touchscreen on a mobile device; etc.).

The system 100 includes: the user device 104, including a user interface 106; a trademark search results engine 108, including a controller 110 and associated memory 112; and a search results data set 114; wherein each of the components of the system 100 may communicate with each other through one or more communication links 116. The memory 112 is configured to store program instructions executable by the controller 110. Although shown adjacent to the controller 110, the memory 112 may be located in a remote server, local device, or within the controller 110.

In the example shown in FIG. 1, the components of the system 100 communicate with each other through communication links 116 embodied in a communications network such as the Internet, though it is understood that the components of the system may communicate with each other through any known communications links 116 using any known communication protocol, as will be understood by those skilled in the art based on the descriptions provided herein. It is also further contemplated that although the user device 104, the trademark search results engine 108, and the search results data set 114 are shown as independent and distinct elements, they may be embodied in a single device or spread amongst a greater number of devices. The example provided in FIG. 1 is meant simply as a representative example that provides clarity in the description.

As shown in FIG. 1, the controller 110 and memory 112 define a trademark search results engine 108. In an example, the trademark search engine 108 performs a trademark search to produce the search results data set 114. For example, a user 102 may input a trademark to be searched (i.e., the searched mark 120) into the trademark search results engine 108 via a user interface 106 of a user device 104.

In response to executing the program instructions, the controller 110 is configured to receive a trademark search result data set 114. The trademark search result data set 114 may be retrieved directly from the trademark search results engine 108 or from any local or remote server or a local or remote database accessible by the controller 110. The search results data set 114 may be a defined closed data set or may be continually or periodically updated. For example, the search results data set 114 may be streamed to the controller 110. In an example, the search results data set 114 may be provided to the trademark search results engine 108 by or through the user device 104.

The trademark search result data set 114 includes a searched mark 120, a plurality of references 122, and at least one proximity score 124 between each reference 122 and the searched mark 120. The searched mark 120 may be a proposed mark that a user may be interested in pursuing a trademark. The references 122 include marks that were found in a trademark search and identified as relevant to a proposed registration of the searched mark 120.

The proximity score 124 between a given reference 122 and the searched mark 120 may represent an objective measurement associated with any number of factors. For example, the factors may include a similarity in appearance between the searched mark 120 and the given reference 122, a similarity in sound between the searched mark 120 and the given reference 122, a similarity in connotation between the searched mark 120 and the given reference 122, a similarity in commercial impression between the searched mark 120 and the given reference 122, a similarity of the goods/services between the searched mark 120 and the given reference 122, a similarity of trade channels between the searched mark 120 and the given reference 122. For example, if there is a high degree of similarity in appearance between the searched mark 120 and a given reference 122, the proximity score 124 may be higher in value. Similarly, if there is a high degree of similarity in commercial impression between the searched mark 120 and a give reference 122, the proximity score 124 may be a higher value.

In addition, the proximity score 124 may represent an objective measurement of the similarity of the conditions under which sales are made between the searched mark 120 and the given reference 122. For example, a greater proximity score 124 may be associated with a greater similarity between the sale conditions between the searched mark 120 and the reference 122. In yet another example, the proximity score 124 may also represent an objective measurement of the fame of the given reference 122. For example, a greater proximity score 124 may be associated with a reference with a high degree of fame. A higher degree of fame will indicate to the user 102 that the reference 122 is more relevant and a greater concern.

In an example, the at least one proximity score 124 includes an overall proximity score 132 between each reference 122 and the searched mark 120, wherein the overall proximity score 132 for a given reference 122 is derived from an aggregation of a plurality of proximity scores 124 between the given reference 122 and the searched mark 120. For example, the overall proximity score 132 may be based on a proximity score 124 related to the similarity in appearance between the searched mark 120 and the reference 122, and a proximity score 124 associated with the similarity in the trade channels between the searched mark 120 and the reference 122. The overall proximity score 132 may be based on any combination of proximity scores 124. Further, the overall proximity score 132 may be based on a weighted aggregation of a plurality of proximity scores 124 between the given reference 122 and the searched mark 120. For example, if certain factors are more important to the user 102, the overall proximity score 132 may take into account only the relevant proximity scores 124 associated with the user selected factors.

In an example, the proximity score 124 may be a proximity score 124 for the buyers to whom the goods/services are sold or the channels of trade through which the goods/service are sold derived from social media data. The proximity score 124 may also be a proximity score 124 based on the reputation of a given reference derived from social media data.

The controller 110 is configured to provide, through the user interface 106, an interactive visual representation 126 (FIG. 5) of the search results data set 114 on a display 118. Specifically, the visual representation 126 includes a displayed relationship between the searched mark 120 and one or more of the plurality of references 122. The display 118 may be any suitable display 118 including, but not limited to, an electronic display on a computer screen or any mobile device, a printed display, among others. As shown in the example provided in FIG. 5, the display 118 may be embodied within the user interface 106 of the user device 104.

The displayed relationship between the searched mark 120 and the one or more references 122 is a visual representation of the proximity score 124 between the searched mark 120 and each of the references 122. In an example, a proximity score 124 is represented by a numerical score, with a higher score representing a higher concern with respect to the searched mark 120. It is contemplated that in some instances a lower proximity score 124 may indicate a higher concern. It is further understood that a proximity score 124 is not required to be a numerical score.

The visual representation 126 of the proximity score 124 between the searched mark 120 and each of the references 122 may be such that a distance between a visual object representing the searched mark 120 and visual objects representing the references 122 represents a magnitude of the proximity score 124. In addition, or as an alternative, the visual representation 126 of the proximity score 124 between the searched mark 120 and each of the references 122 may be communicated via shape, color, boldness, size, or motion.

Figure 2:
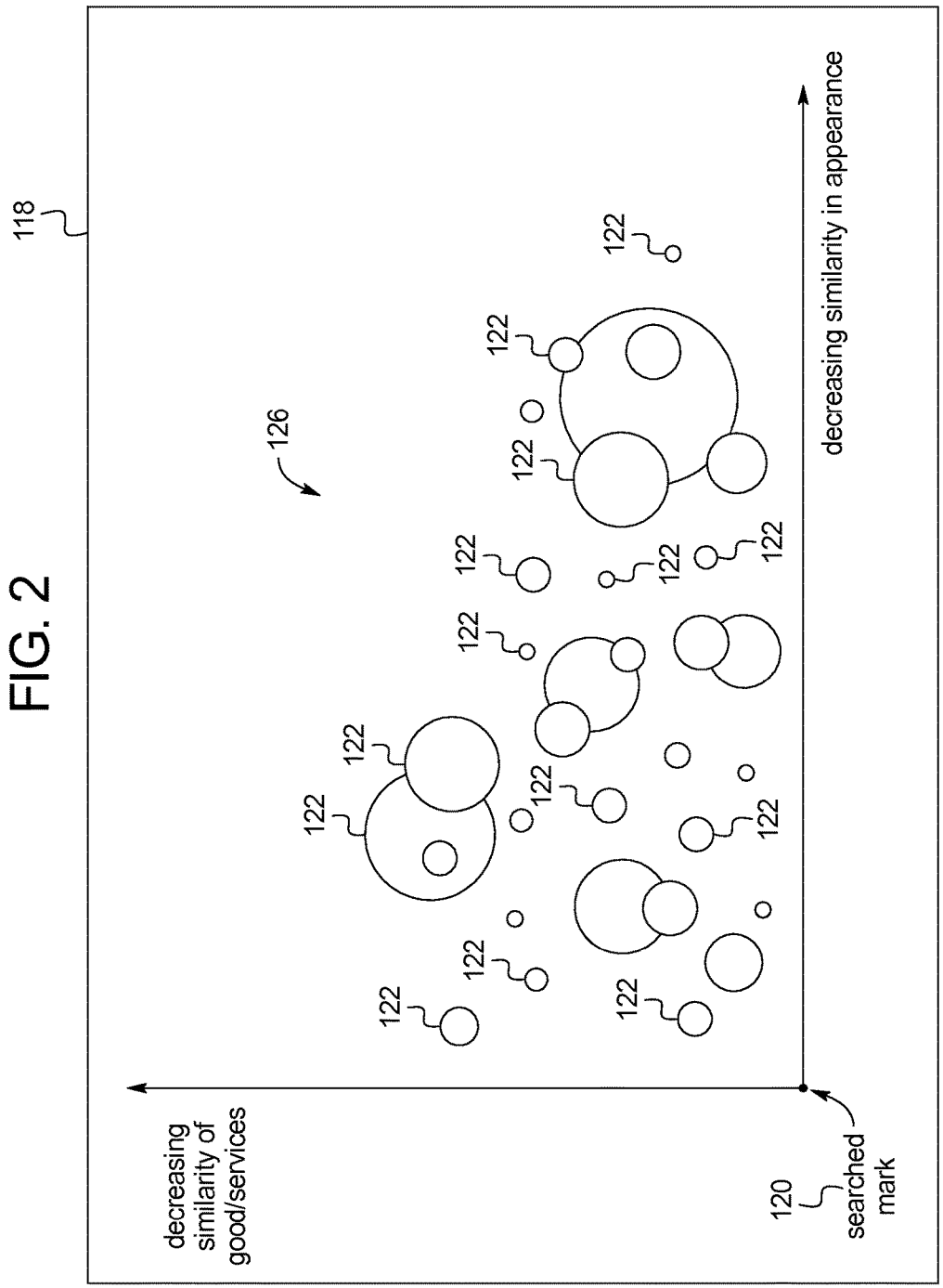
FIG. 2 is an example of a visual representation of trademark search results.

For example, as shown in FIG. 2, the interactive visual representation 126 on the display 118 includes a plurality of displayed relationships embodied in a scatter plot between the searched mark 120 and the plurality of references 122. As shown, the searched mark 120 is visually located at the intersection of the x and y-axis. The references 122 closest in proximity to the searched mark 120 are greater in similarity than the references 122 located farther away from the searched mark 120. Each axis may represent a different proximity score, such that the single interactive visual representation 126 quickly communicates information about two distinct proximity scores. Specifically, in the example provided in FIG. 2, as the position of the reference 122 increases along the y-axis, similarity of goods and services between the reference 122 and the searched mark 120 decreases. As the position of the reference 122 increases along the x-axis, the similarity in appearance between the searched mark 120 and the reference 122 decreases. Further, the size of the visual depiction of a reference 122 may be proportional to a relative fame of a reference 122, which, while such fame information may not be a proximity score, it is valuable information quickly communicated through the interactive visual representation 126. Of course, the x-axis, y-axis, and the size or shape of the visual depiction of the references 122 may be visual representations of any number of factors including, but not limited to, similarity in appearance, sound, connotation, commercial impression, goods and services, trade channels, conditions under which sales are made, among others, between the searched mark 120 and the reference 122.

Figure 3:
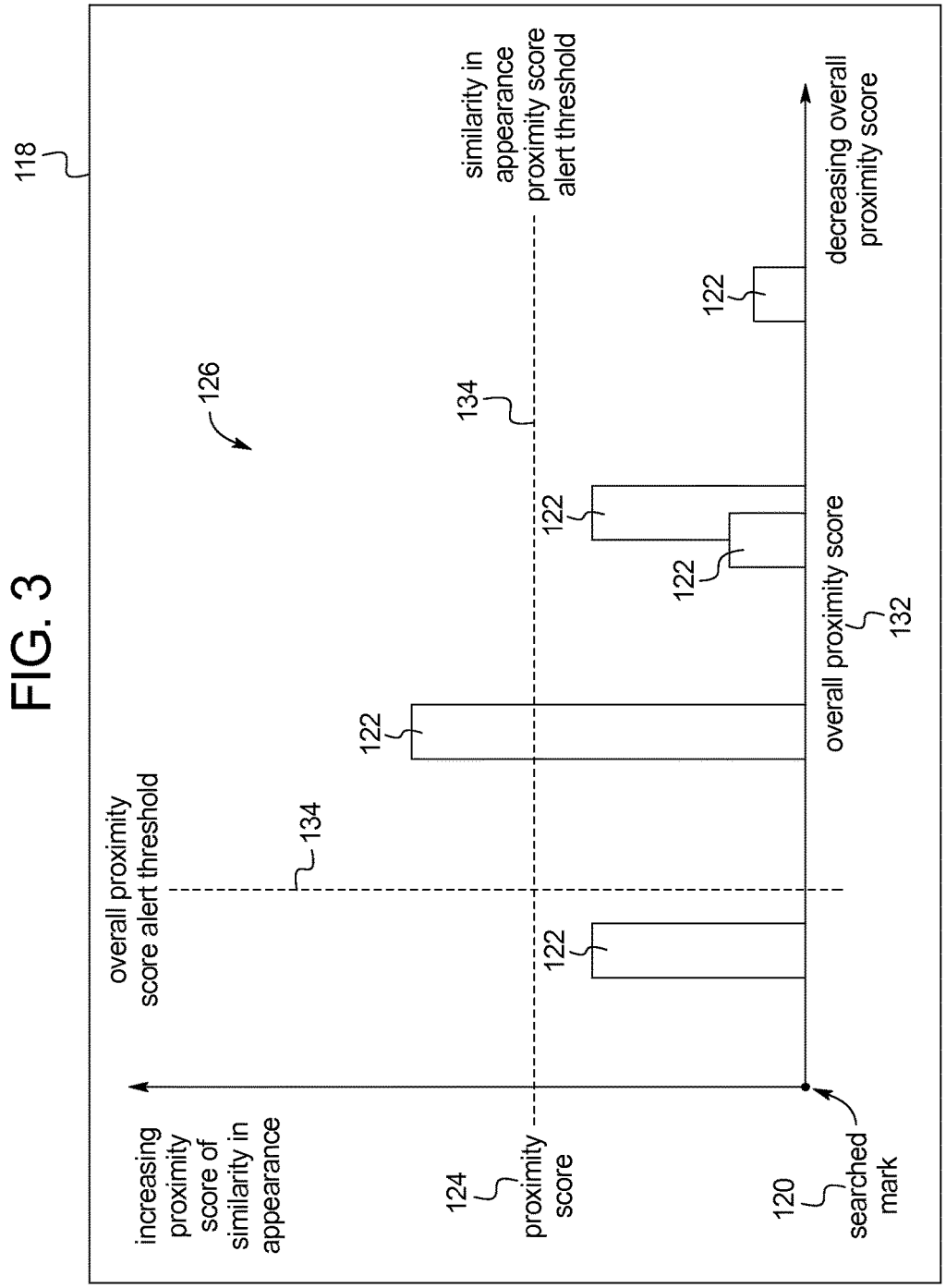
FIG. 3 is another example of a visual representation of trademark search results.

Another example of the interactive visual representation 126 shown on a display 118 is provided in FIGS. 3 and 4. In this example, the visual representation 126 provides displayed relationships in the form of a bar graph. For each reference 122, the height of the associated bar indicates an increasing proximity score 124 related to a similarity of appearance between the searched mark 120 and the reference 122. The position of the bar graph along the x-axis indicates an overall proximity score 132, with the proximity score 132 decreasing as you move right along the x-axis.

In the example shown in FIG. 3, the overall proximity score 132 may be calculated based on a weighted average of a plurality of proximity scores 124, each proximity scores 124 related to a user-adjustable weighting factor 130. FIG. 4 is a visual representation for the same searched mark 120 and the same search result data set 114 that as that in FIG. 3, but the user has adjusted one or more of the weighting factors 130 to provide an updated overall proximity score 132. As you can see, the position of the references 122 along the x-axis are different between FIGS. 3 and 4 owing to different weighting factors 130 used to generate the overall proximity score 132. By adjusting the weighting factors 130, the user can view the relationship between the same searched mark 120 and the same search result data set 114 from various perspectives. For example, in one expression of the relationships, the overall proximity score 132 for each mark may be altered by setting the weighting factor for several of the factors to be zero, thereby removing that factor from the analysis. In a more specific example, a user may wish to gain the perspective of the relationships of the searched mark 120 and the search result data set 114 without considering geographic scope and may therefore eliminate the influence of the geographic scope factor by setting its associated weighting factor to zero.

As described, the controller 110 may be configured to provide the user control through which a user manipulates a weighting factor 130 associated with at least one of the visually represented proximity scores 124, thereby altering the visual representation 126. For example, FIG. 5 depicts one example of a screen shot of a trademark search results control panel wherein a user 102 may enter via the user interface 106 the searched mark 120 and the user 102 may adjust the weight of each weighting factor 130 to the user's preference. As shown in FIG. 5, the exact numerical information associated with the proximity scores 124 associated with each individual weighting factor 130 may be displayed. The controller 110 via the control panel may enable a user 102 to select which factor or combination of factors are used in the proximity score 124 on the x-axis and the y-axis in the visual representation 126. In addition, the control panel may have an input for a user 102 to input new data.

FIG. 5 is merely one example of a control panel through which a user may manipulate the weighting factors 130 that are used to determine proximity scores. A wide range of alternative control panels will be recognized by those skilled in the art based on the descriptions and teachings provided herein.

The controller 110 may be further configured to automatically trigger an alert when a proximity score 124 between a reference 122 and the searched mark 120 exceeds a proximity score alert threshold 134. In an example, the proximity score alert threshold 134 is binary condition triggered by a specific value of an owner variable (e.g., whether or not the owner of a reference 122 matches the preset alert condition value).

The proximity score alert threshold 134 may be manually set by a user 102 of the system and a comparison of the proximity score 124 between each reference 122 and the searched mark 120 and the proximity score alert threshold 132 may be automatically analyzed by the controller 110. For example, as shown in FIG. 3, the dashed lines illustrate two proximity score alert thresholds 134. In this example, the controller 110 may alert the user 102 of any reference 122 whose proximity score 124 crosses the proximity score alert threshold 134. Alternatively, the controller 110 may alert the user only if the reference 122 crosses both alert proximity score alert thresholds 134.

The proximity score alert thresholds 134 shown in FIGS. 3 and 4 are merely examples of the various proximity score alert thresholds 134 that may be set. For example, in one contemplated embodiment, the visual representation 126 may include a two axis scatter plot representation wherein each axis illustrates a proximity score 124 for an individual factor. Additionally, the size of the plots may indicate a third proximity score 124 (the larger the plot, the larger the proximity score 124), the color of the plots may indicate a fourth proximity score 124 (the further towards the red end of the color spectrum, the larger the proximity score 124), the rate at which the plot blinks on and off may indicate a fifth proximity score 124 (the faster the blinking, the larger the proximity score 124), the rate at which the plot rotates may indicate a sixth proximity score 124 (the faster the rotation, the larger the proximity score 124), etc. In such a visual representation 126, it may not make sense to visually represent the proximity score alert thresholds 134 in any way. But the proximity score alert thresholds 134 may themselves be complex algorithms based on a combination of factors. In such manner, the visual representation 126 may provide one perspective from which the user may view the search result data set 114, while the underlying proximity score alert thresholds 134 automatically perform the function of identifying potentially problematic relationships from other perspectives not visualized.

The examples provided above in FIGS. 2-5 focus on the visual representation 126 of proximity scores 124. However, the principles taught herein may be used to define other scores, such as divergent scores. Divergent scores may be, for example, representations of the distance between a searched mark 120 and the proximity score 124 of its closest reference 122. Accordingly, a visual representation 126 such as that in FIG. 2, wherein the intersection of the x-axis and y-axis represents a searched mark 120 that is furthest from its closest reference 122. The representations of other searched marks 120 may be provided on the visual representation 126 a distance from the intersection of the x-axis and y-axis that represents their distance from their closest references 122. In other words, the higher the proximity score 124 between a searched mark 120 and its closest reference 122, the further from the intersection of the x-axis and y-axis the searched mark 120 will be represented.

It should be noted that various changes and modifications to the embodiments described herein will be apparent to those skilled in the art. Such changes and modifications may be made without departing from the spirit and scope of the present invention and without diminishing its attendant advantages.

I claim:

1. A system providing trademark search results comprising:
   a controller;
   a display controlled by the controller; and
   a memory coupled to the controller, wherein the memory is configured to store program instructions executable by the controller;
   wherein in response to executing the program instructions, the controller is configured to:
      receive a trademark search result data set including a searched mark, a plurality of references, arid a plurality of proximity scores between each reference and the searched mark, wherein the plurality of proximity scores between each reference and the searched mark is each based on a plurality of categories selected from the group of: similarity in appearance, similarity in sound, similarity in connotation, and similarity of the goods and services;
      calculate a first relationship and a second relationship between each reference and the searched mark, wherein the first relationship and the second relationship for a given reference is calculated from a weighted aggregation of the plurality of proximity scores between the given reference and the searched mark according to a first algorithm and a second algorithm, each adjustable through a user controlled dashboard;
      provide through the display an interactive visual representation between the searched mark and at least two of the plurality of references, wherein the visual representation includes a two-dimensional graph including an x-axis and a y-axis, wherein a representation of the searched mark is displayed at an intersection of the x-axis and the y-axis and the relationship between the searched mark and each of the at least two of the plurality of references is shown by displaying a reference representation of each of the at least two of the plurality of references at a position on the two-dimensional graph wherein an x-axis position of the reference representation corresponds to a magnitude of the first relationship and a y-axis position of the reference representation corresponds to a magnitude of the second relationship; and
      provide through the display one or more fields for receiving user input that is factored into the first algorithm and the second algorithm, wherein the user input comprises a weighting factor for each category on which the first relationship and the second relationship are based;

adjust the first algorithm and a second algorithm used to calculate the first relationship and the second relationship based on user input by applying the weighting factors of the user input to the first algorithm and the second algorithm; and dynamically adapt the interactive visual representation based on the user input in real-time.

2. The system of claim 1 wherein the controller is further configured to provide a control through which a user manipulates a weighting factor associated with at least one of the visually represented proximity scores, thereby altering the visual representation.

3. The system of claim 1 wherein the plurality of proximity scores between a given reference and the searched mark includes a proximity score representing an objective measurement of similarity in commercial impression between the searched mark and the given reference.

4. The system of claim 1 wherein the plurality of proximity scores between a given reference and the searched mark includes a proximity score representing an objective measurement of similarity of trade channels between the searched mark and the given reference.

5. The system of claim 1 wherein the plurality of proximity scores between a given reference and the searched mark includes a proximity score representing an objective measurement of the similarity of the conditions under which sales are made between the searched mark and the given reference.

6. The system of claim 1 wherein the plurality of proximity scores between a given reference and the searched mark includes a proximity score representing an objective measurement of the fame of the given reference.

7. The system of claim 1 wherein the plurality of proximity scores are each represented by a numerical score, with a higher score representing a higher concern.

8. The system of claim 1 wherein the plurality of proximity scores includes a proximity score for the buyers to whom the goods/services are sold or the channels of trade through which the goods/service are sold derived from social media data.

9. The system of claim 1 wherein at least one proximity score is a proximity score based on the reputation of a given reference derived from social media data.

10. The system of claim 1 wherein the controller is further configured to trigger an alert when the first relationship or the second relationship between a reference and the searched mark exceeds an alert threshold.

11. The system of claim 10 wherein the alert threshold is binary condition triggered by a specific value of an owner variable.

12. The system of claim 10 wherein the alert threshold is manually set by a user of the system and a comparison of the first relationship or the second relationship between each reference and the searched mark and the alert threshold is automatically analyzed by the controller.

* * * * *